(12) United States Patent
Pagani

(10) Patent No.: US 11,577,633 B2
(45) Date of Patent: Feb. 14, 2023

(54) MOTORCYCLE BACK RIDER ARMREST AND SEAT

(71) Applicant: Candy's Arm Rests, LLC., Troutman, NC (US)

(72) Inventor: Joseph L. Pagani, Troutman, NC (US)

(73) Assignee: CANDY'S ARM RESTS, LLC, Troutman, NC (US)

( * ) Notice: Subject to any disclaimer, the term of this patent is extended or adjusted under 35 U.S.C. 154(b) by 204 days.

(21) Appl. No.: 16/951,644

(22) Filed: Nov. 18, 2020

(65) Prior Publication Data

US 2022/0041085 A1    Feb. 10, 2022

Related U.S. Application Data

(60) Provisional application No. 63/063,595, filed on Aug. 10, 2020.

(51) Int. Cl.
| | |
|---|---|
| *B60N 2/75* | (2018.01) |
| *B60N 2/015* | (2006.01) |
| *B60N 2/24* | (2006.01) |
| *B62J 1/28* | (2006.01) |

(52) U.S. Cl.
CPC .............. *B60N 2/75* (2018.02); *B60N 2/015* (2013.01); *B60N 2/24* (2013.01); *B62J 1/28* (2013.01)

(58) Field of Classification Search
CPC ....... B62J 7/04; B62J 1/00; B62J 1/28; B60N 2/75; B60N 2/24; B60N 2/015

USPC ................ 296/78.1, 64; 180/219, 218, 205; 224/413

See application file for complete search history.

(56) References Cited

U.S. PATENT DOCUMENTS

| | | | | |
|---|---|---|---|---|
| 1,279,260 | A * | 9/1918 | Chilson ................ | A47C 13/005 297/195.12 |
| 4,690,237 | A * | 9/1987 | Funabashi ................. | B62J 9/23 224/415 |
| 6,543,831 | B2 * | 4/2003 | Takemura ................ | B62J 17/04 296/78.1 |
| 7,357,456 | B1 * | 4/2008 | Freer ...................... | B60N 2/787 297/411.25 |
| 2014/0061269 | A1 * | 3/2014 | Hawkins .................. | B62J 1/007 224/413 |
| 2015/0028074 | A1 * | 1/2015 | Brusky .................. | A47C 7/624 224/413 |

* cited by examiner

*Primary Examiner* — D Glenn Dayoan
*Assistant Examiner* — Sunsurraye Westbrook
(74) *Attorney, Agent, or Firm* — Shumaker, Loop & Kendrick, LLC.; S. Alexander Long, Jr.

(57) ABSTRACT

A motorcycle armrest and back rider seat are provided. The seat includes an armrest mounting bracket adapted for being removably mounted to a motorcycle at a position above a rear wheel and proximate to a back rider seat bottom and seat back and a forearm support carried by one end of the armrest mounting bracket and adapted to extend horizontally forward in a back rider forearm supporting position when the armrest mounting bracket is mounted on the motorcycle.

16 Claims, 4 Drawing Sheets

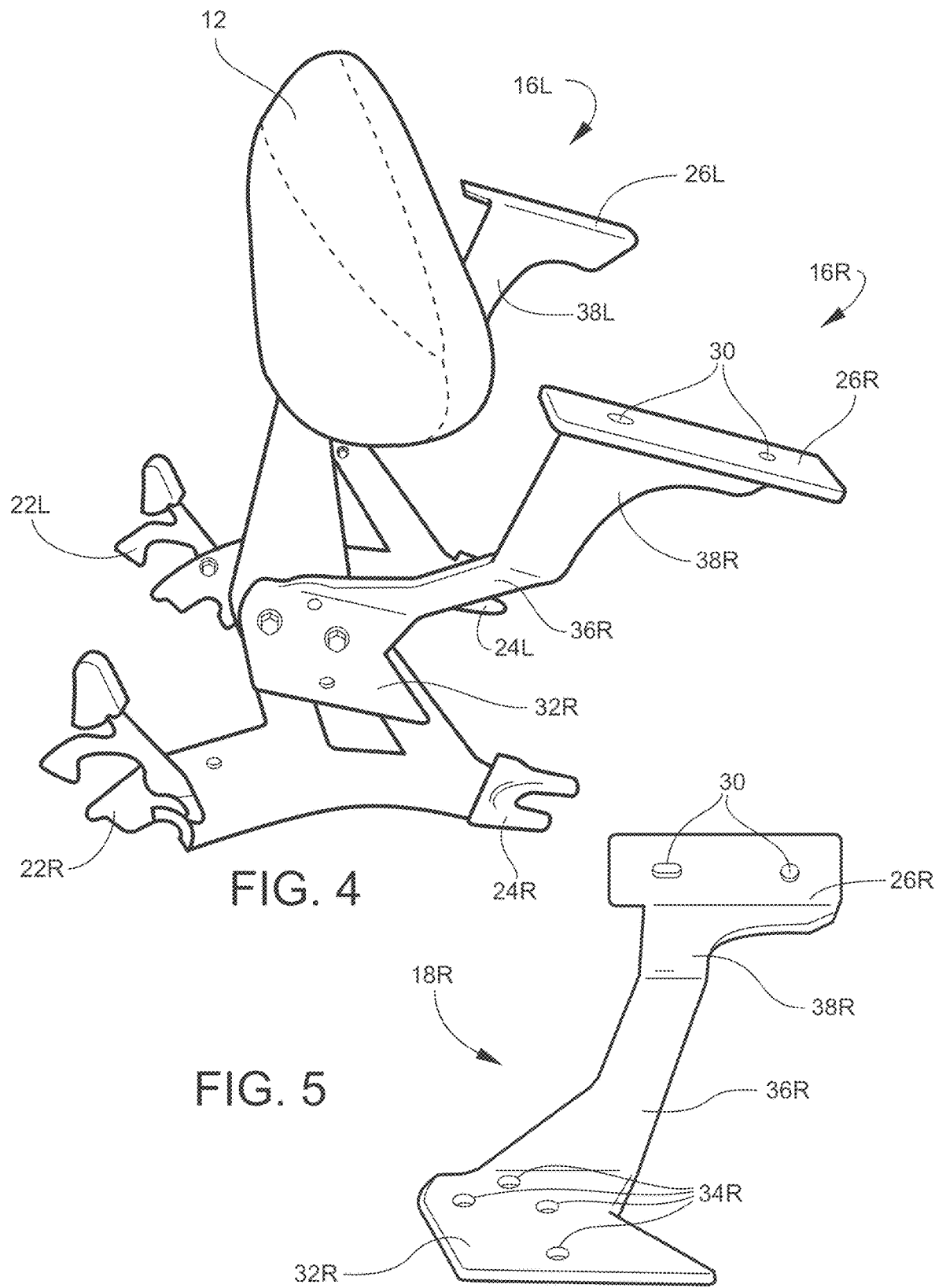

MOTORCYCLE BACK RIDER ARMREST AND SEAT

PRIORITY CLAIM

This utility patent application claims priority to the U.S. Provisional Application No. 63/063,595 filed on Aug. 10, 2020, the contents of which are incorporated by reference into this application.

TECHNICAL FIELD AND BACKGROUND OF INVENTION

This application discloses an armrest and seat for the back rider of a motorcycle that does not have fittings necessary to accommodate an armrest for a sissy bar or similar back rider seat. In general, the invention is an armrest that attaches in any manner to a sissy bar or a luggage rack of a motorcycle without regard to the manner of attachment. The armrest may be bolted to the motorcycle, or attached using quick attachments whereby the armrests may be quickly and easily installed for use, and easily and quickly removed when not needed. The novel armrest includes mounting brackets for mounting the armrests to a rear fender, luggage rack or frame of the motorcycle or to a padded metal back rest, whether factory or aftermarket. The invention of this application is distinct from "full dresser" types of motorcycles that have fully padded back and wrap around armrests integrated into one unit. The armrests are also disclosed as part of a back rider seat.

SUMMARY OF INVENTION

According to one preferred embodiment of the invention, a motorcycle armrest is provided and includes an armrest mounting bracket adapted for being removably mounted to a motorcycle at a position above a rear wheel and proximate to a back rider seat bottom and seat back and a forearm support carried by one end of the armrest mounting bracket and adapted to extend horizontally forward in a back rider forearm supporting position, when the armrest mounting bracket is mounted on the motorcycle.

According to another embodiment of the invention, the armrest mounting bracket and the forearm support are integrally formed.

According to another embodiment of the invention, a pair of the armrests when mounted on the motorcycle define a first laterally spaced-apart distance at the point of attachment to the motorcycle and a second, more widely spaced-apart distance at the forearm support and defining an anatomically-correct width for accommodating forearms of a back rider.

According to another embodiment of the invention, the forearm support includes a planar upper surface adapted to face forwardly when mounted on the motorcycle.

According to another embodiment of the invention, an arm pad is secured to the planar upper surface of the forearm support.

According to another embodiment of the invention, the armrest mounting bracket includes an attachment plate with mounting holes for receiving bolts that attach the armrest mounting bracket to the motorcycle and a lower bracket segment formed with the attachment plate and flared outwardly and upwardly from the attachment plate at a predetermined first angle relative to the attachment plate. An upper bracket segment is formed with the lower bracket segment and is flared outwardly and upwardly from the lower bracket segment at a second predetermined angle that is greater relative to the attachment plate than the first angle, and is joined at an upper end with the forearm support.

According to another embodiment of the invention, the attachment plate, lower bracket segment, upper bracket segment and forearm support are integrally formed of a single piece of material.

According to another embodiment of the invention, back rider seat for a motorcycle is provided and includes a back rider seat back mounted to the motorcycle above a rear wheel and a back rider seat bottom mounted to the motorcycle below and forward of the back rider seat back. Left and right armrests having respective left and right mounting brackets are adapted for removably mounting the left and right armrests to the motorcycle. Respective left and right forearm supports are carried on one end of the left and right armrest mounting brackets and are adapted to extend horizontally forward in a back rider forearm supporting position when the left and right forearm support mounting brackets are mounted on the motorcycle.

According to another embodiment of the invention, a pair of armrests when mounted on a motorcycle define a first laterally spaced-apart distance at the point of attachment to the motorcycle "M" and a second, more widely spaced-apart distance at the forearm support and, defining an anatomically-correct width for accommodating the forearms of the back rider.

According to another embodiment of the invention, the forearm support includes a planar upper surface adapted to face forwardly when mounted on the motorcycle.

According to another embodiment of the invention, an arm pad is secured to the planar upper surface of the forearm support.

According to another embodiment of the invention, the armrest mounting bracket includes an attachment plate with mounting holes for receiving bolts that attach the armrest mounting bracket to the motorcycle. A lower bracket segment is formed with the attachment plate and flared outwardly and upwardly from the attachment plate at a predetermined first angle relative to the attachment plate. An upper bracket segment is formed with the lower bracket segment and is flared outwardly and upwardly from the lower bracket segment at a second predetermined angle that is greater relative to the attachment plate than the first angle, and is joined at an upper end with the forearm support.

According to another embodiment of the invention, the attachment plate, lower bracket segment, upper bracket segment and forearm support are integrally formed of a single piece of material.

According to another embodiment of the invention, a back rider seat for a motorcycle is provided and includes a back rider seat back mounted to the motorcycle above a rear wheel and a back rider seat bottom mounted to the motorcycle below and forward of the back rider seat back.

Left and right armrests have respective left and right armrest mounting brackets adapted for removably mounting the left and right armrests to the motorcycle. The left and right armrest mounting brackets each include an attachment plate with mounting holes for receiving bolts that attach the armrest mounting bracket to the motorcycle. A lower bracket segment is formed with the attachment plate and is flared outwardly and upwardly from the attachment plate at a predetermined first angle relative to the attachment plate. An upper bracket segment is formed with the lower bracket segment and is flared outwardly and upwardly from the lower bracket segment at a second predetermined angle that is greater, relative to the attachment plate than the first angle, and is joined at an upper end with the forearm support. The attachment plate, lower bracket segment, upper bracket segment and forearm support of the left and right mounting brackets are integrally formed of a single piece of material. Respective left and right forearm supports are carried by the left and right armrest mounting brackets and are adapted to extend horizontally forward in a back rider forearm supporting position when the left and right forearm support mounting brackets are mounted on the motorcycle. The armrest mounting brackets and the forearm supports are integrally formed.

BRIEF DESCRIPTION OF THE DRAWINGS

FIG. 4 is a further perspective view of the back rider seat back and attached left and right armrest shown in FIGS. 1, 2 and 3;

FIG. 5 is a perspective view of a right side armrest according to one embodiment of the invention.

DETAILED DESCRIPTION OF PREFERRED EMBODIMENT

Figure 1:
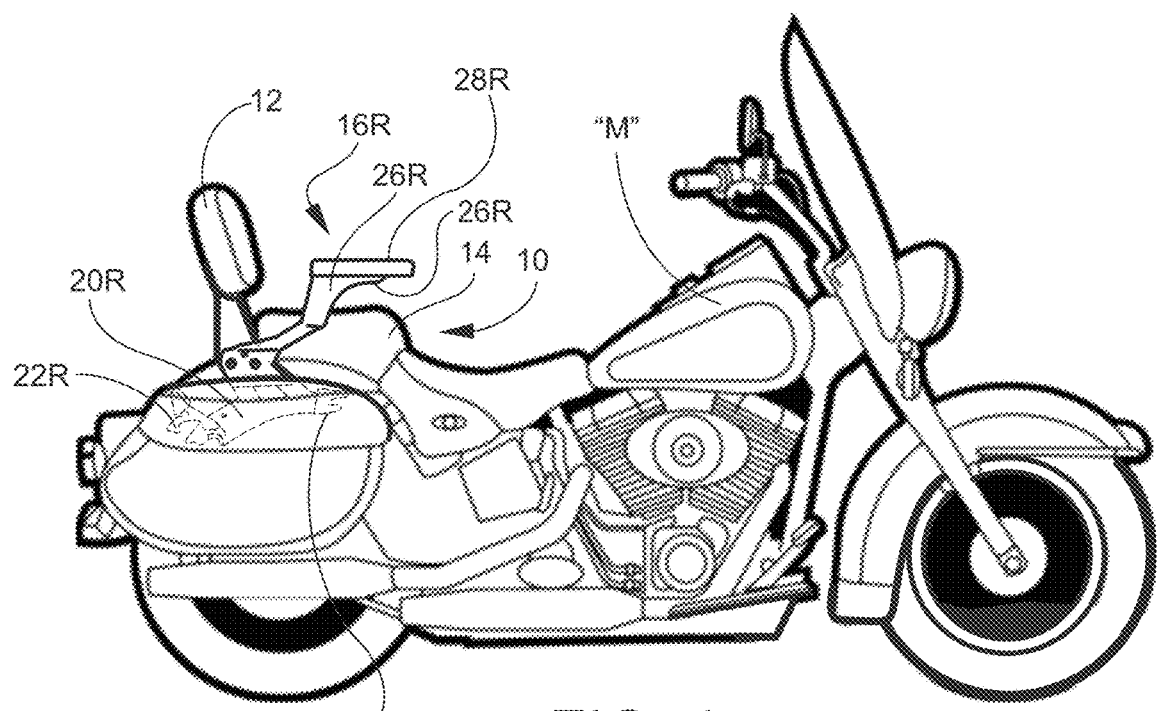
FIG. 1 is a side elevation of a motorcycle showing a right side armrest, according to an embodiment of the invention attached to a back rider seat.

Referring now to the drawings, a back rider seat 10 is shown in FIG. 1 mounted on a motorcycle "M." The back rider seat 10 includes a seat back 12 and a seat bottom 14. A right armrest 16R includes an armrest mounting bracket 18R for mounting the armrest 16R to the rear fender or frame of the motorcycle "M." In the embodiment shown in FIG. 1, the armrest mounting bracket 18R mounts to a seat mounting bracket 20R that includes attachment elements 22R and 24R on front and rear ends, respectively, of the seat mounting bracket 20R for attaching to the rear fender or frame of the motorcycle "M". The armrest mounting bracket 18R carries a forearm support 26R which extends upwardly and forwardly into a horizontally-extending forearm support position on the right side of the seat back 12 and above the seat bottom 14, as shown. An arm pad 28R is shown mounted on the top surface of the forearm support 26R.

Figure 2:
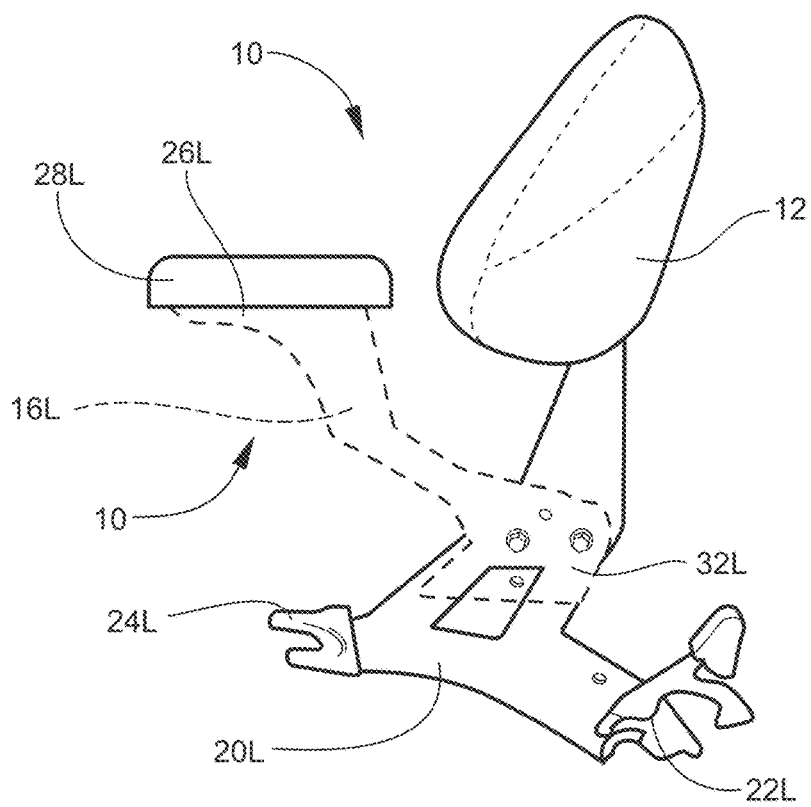
FIG. 2 is a side elevation of an embodiment of a left side armrest and back rider seat.

Referring to FIG. 2, a left hand armrest 16L is shown in dotted lines mounted to the back rider seat back 12. As described above, the left hand armrest 16L includes an armrest mounting bracket 18L for mounting the armrest 16L to a seat mounting bracket 20L mounted to the motorcycle "M." The seat mounting bracket 20L includes attachment elements 22L and 24L on rear and front ends of the seat mounting bracket 20L for attaching to the rear fender or frame of the motorcycle "M".

The armrest mounting bracket 18L carries a forearm support 26L, which extends upwardly and forwardly into a horizontally-extending forearm support position on the right side of the seat back 12, as shown. An arm pad 28L is shown mounted on the top surface of the forearm support 26L.

As shown in FIGS. 1-2, the arm pads 28R and 28L may be mounted to the armrests 16R and 16L with bolts.

FIGS. 2-6 indicate bolt holes 30 in the forearm supports 26R and 26L through which bolts may be extended to mount the arm pads 28R and 28L.

Figure 6:
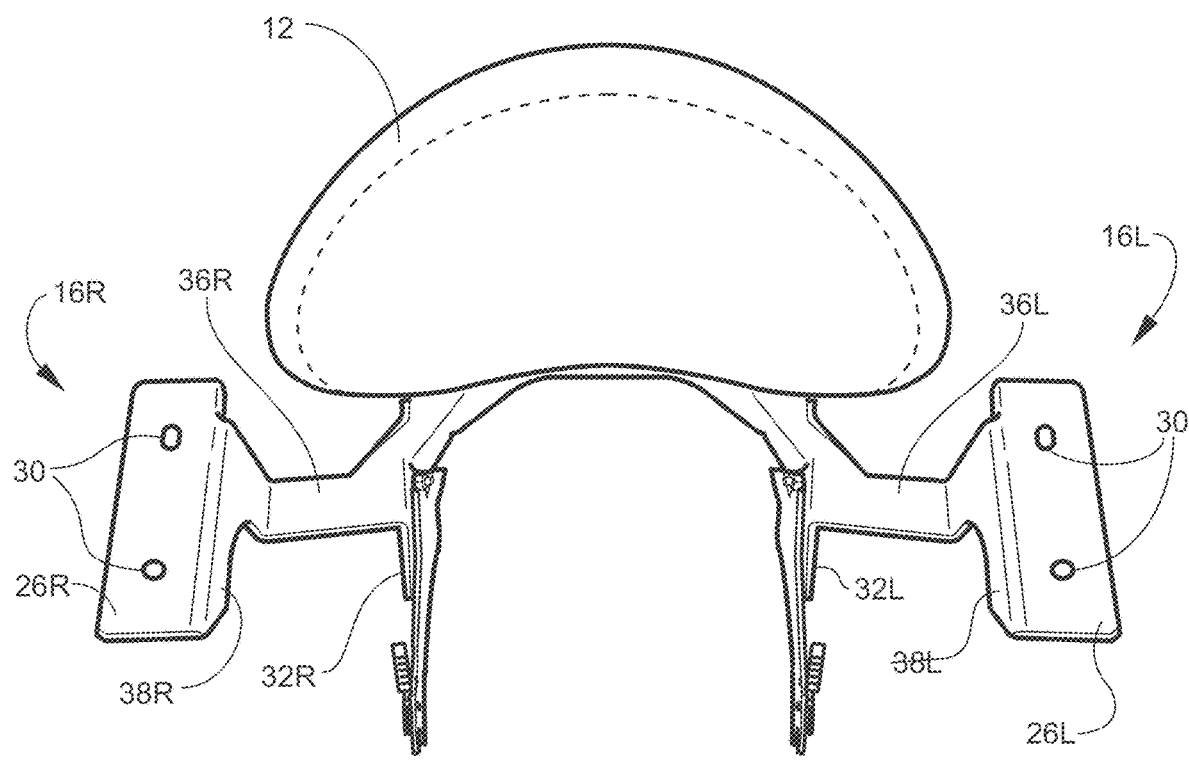
FIG. 6 is a front elevation of a back rider seat back and attached left and right armrests according to an embodiment of the invention.

Also shown in FIGS. 2-6, the armrest mounting brackets 18R, 18L are bent to define a first, laterally spaced-apart distance at the point of attachment to the motorcycle "M" and a second, more widely spaced-apart distance at the forearm supports 26R, 26L defining an anatomically correct width for accommodating the forearms of the back rider. The extent of this variant spacing is best shown in FIG. 6, showing in this particular embodiment that the forearm supports 26R, 26L of the armrests 16R, 16L extend laterally outboard of sides of the seat back 12.

As best shown in FIG. 5, the armrest mounting bracket 18R includes an attachment plate 32R with mounting holes 34R for receiving bolts that attach the armrest mounting bracket 18R to the motorcycle "M." A lower bracket segment 36R flares outwardly and upwardly from the attachment plate 32R and is integrally formed with an upper bracket segment 38R that flares outwardly and upwardly at a steeper angle, and is preferably integrally joined at its upper extent with the forearm support 26R.

Figure 3:
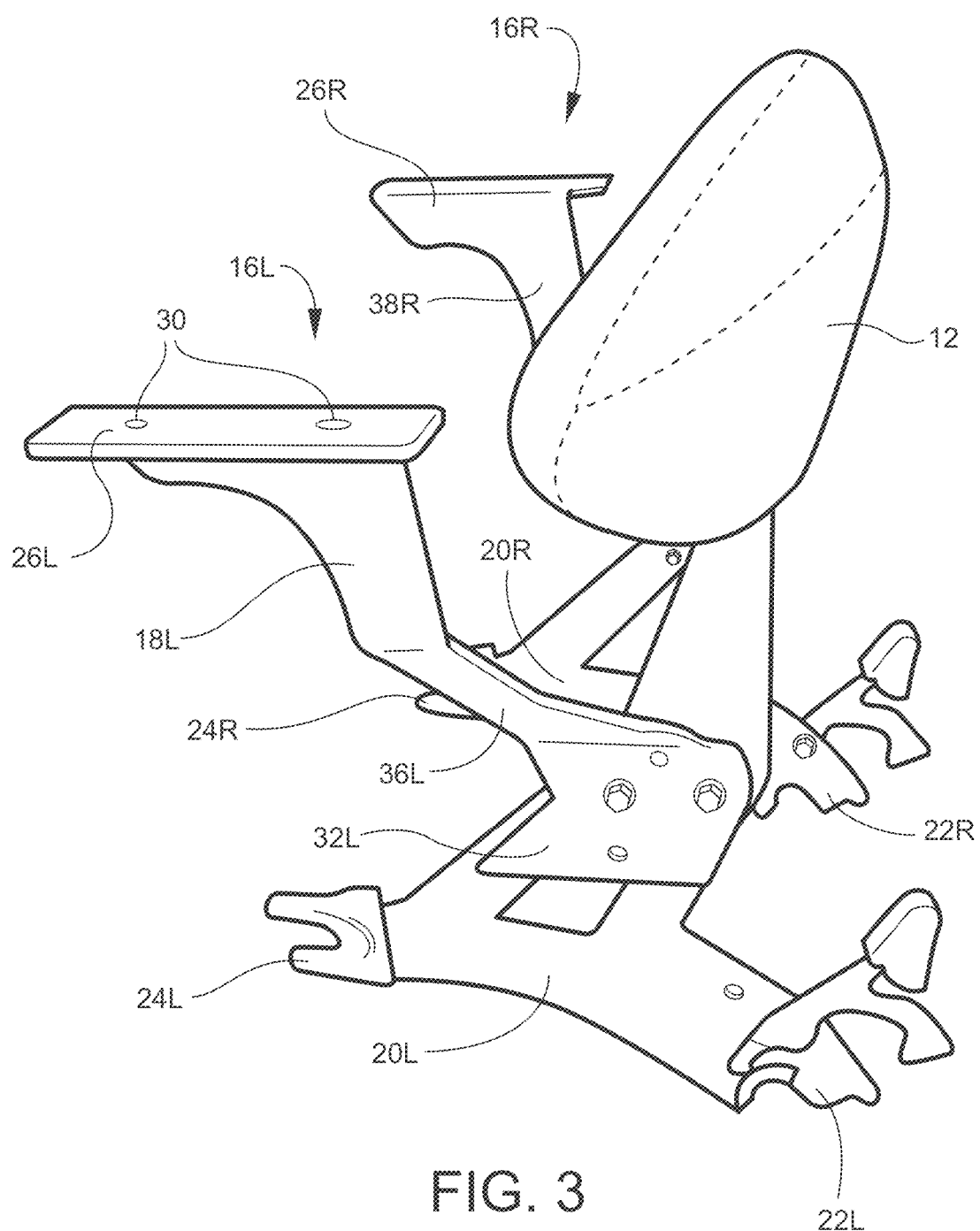
FIG. 3 is a perspective view of the back rider seat back and attached left and right armrests.

As best shown in FIGS. 2 and 3, the armrest 16L is a mirror image of the armrest 16R and has complementary elements as described above, namely, an attachment plate 32L with mounting holes 34L for receiving bolts that attach the armrest mounting bracket 18L to the motorcycle "M." A lower bracket segment 36L flares outwardly and upwardly from the attachment plate 32L and is integrally formed with an upper bracket segment 38L that flares outwardly and upwardly at a steeper angle, and is preferably integrally joined at its upper extent with the forearm support 26L.

The armrests 16R, 16L are preferably fabricated from steel, but can be manufactured from other materials, such as aluminum, carbon fiber, pultruded, molded, machined fiber reinforced plastic (FRP), E-glass and alloys and composites of these and equivalent materials.

While the armrests 16R, 16L are shown in FIG. 1 mounted on a representative motorcycle with a backrest, the armrests 16R, 16L, according to the general design elements, are intended with suitable mounting features to be mounted on, by way of example, Harley Davidson, Polaris (Indian and Victory Motorcycles) and foreign manufacturers such as Honda, Kawasaki, Suzuki, Yamaha, BMW, Ducati, and Can Am as original equipment or for sale as an aftermarket product sold by manufacturers and marketers of motorcycle back rests. The armrests 16R, 26L can be used on both 2- or 3-wheel motorized vehicles.

An armrest for motorcycles according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. A motorcycle armrest, comprising:
    (a) an armrest mounting bracket adapted for being removably mounted to a motorcycle at a position above a rear wheel and proximate to a back rider seat bottom and seat back; and
    (b) a forearm support carried by one end of the armrest mounting bracket and adapted to extend horizontally forward in a back rider forearm supporting position when the armrest mounting bracket is mounted on the motorcycle, wherein the armrest mounting bracket includes an attachment plate with mounting holes for receiving bolts that attach the armrest mounting bracket to the motorcycle, a lower bracket segment formed with the attachment plate and flared outwardly and upwardly from the attachment plate at a predetermined first angle relative to the attachment plate, an upper bracket segment formed with the lower bracket segment and flared outwardly and upwardly from the lower bracket segment at a second predetermined angle that is greater, relative to the attachment plate than the first angle, and is joined at an upper end with the forearm support.

2. A motorcycle armrest according to claim 1, wherein the armrest mounting bracket and the forearm support are integrally formed.

3. A motorcycle armrest according to claim 1, wherein a pair of the armrests when mounted on the motorcycle define a first laterally spaced-apart distance at the point of attachment to the motorcycle and a second, more widely spaced-apart distance at the forearm support and defining an anatomically-correct width for accommodating forearms of a back rider.

4. A motorcycle armrest according to claim 1, wherein the forearm support includes a planar upper surface adapted to face forwardly when mounted on the motorcycle.

5. A motorcycle armrest according to claim 4, and including an arm pad secured to the planar upper surface of the forearm support.

6. A motorcycle armrest according to claim 1, wherein the attachment plate, lower bracket segment, upper bracket segment and forearm support are integrally formed of a single piece of material.

7. A back rider seat for a motorcycle, comprising:
  (a) a back rider seat back mounted to the motorcycle above a rear wheel;
  (b) a back rider seat bottom mounted to the motorcycle below and forward of the back rider seat back;
  (c) left and right armrests having respective left and right mounting brackets adapted for removably mounting the left and right armrests to the motorcycle; and
  (d) respective left and right forearm supports carried on one end of the left and right armrest mounting brackets and adapted to extend horizontally forward in a back rider forearm supporting position when the left and right forearm support mounting brackets are mounted on the motorcycle, wherein the armrest mounting bracket includes an attachment plate with mounting holes for receiving bolts that attach the armrest mounting bracket to the motorcycle, a lower bracket segment formed with the attachment plate and flared outwardly and upwardly from the attachment plate at a predetermined first angle relative to the attachment plate, an upper bracket segment formed with the lower bracket segment and flared outwardly and upwardly from the lower bracket segment at a second predetermined angle that is greater relative to the attachment plate than the first angle, and is joined at an upper end with the forearm support.

8. A motorcycle armrest according to claim 7, wherein the armrest mounting bracket and the forearm support are integrally formed.

9. A motorcycle armrest according to claim 7, wherein a pair of armrests when mounted on a motorcycle define a first laterally spaced-apart distance at the point of attachment to the motorcycle "M" and a second, more widely spaced-apart distance at the forearm support and, defining an anatomically-correct width for accommodating the forearms of the back rider.

10. A motorcycle armrest according to claim 7, wherein the forearm support includes a planar upper surface adapted to face forwardly when mounted on the motorcycle.

11. A motorcycle armrest according to claim 10, and including an arm pad secured to the planar upper surface of the forearm support.

12. A motorcycle armrest according to claim 7, wherein the attachment plate, lower bracket segment, upper bracket segment and forearm support are integrally formed of a single piece of material.

13. A back rider seat for a motorcycle, comprising:
  (a) a back rider seat back mounted to the motorcycle above a rear wheel;
  (b) a back rider seat bottom mounted to the motorcycle below and forward of the back rider seat back;
  (c) left and right armrests having respective left and right armrest mounting brackets adapted for removably mounting the left and right armrests to the motorcycle;
  (d) wherein the left and right armrest mounting brackets each include an attachment plate with mounting holes for receiving bolts that attach the armrest mounting bracket to the motorcycle, a lower bracket segment formed with the attachment plate and flared outwardly and upwardly from the attachment plate at a predetermined first angle relative to the attachment plate, an upper bracket segment formed with the lower bracket segment and flared outwardly and upwardly from the lower bracket segment at a second predetermined angle that is greater relative to the attachment plate than the first angle, and is joined at an upper end with the forearm support;
  (e) the attachment plate, lower bracket segment, upper bracket segment and forearm support of the left and right mounting brackets being integrally formed of a single piece of material; and
  (f) respective left and right forearm supports carried by the left and right armrest mounting brackets and adapted to extend horizontally forward in a back rider forearm supporting position when the left and right forearm support mounting brackets are mounted on the motorcycle, wherein the armrest mounting brackets and the forearm supports are integrally formed.

14. A back rider seat according to claim 13, wherein the left and right armrests when mounted on the motorcycle define a first laterally spaced-apart distance at the point of attachment to the motorcycle and a second, more widely spaced-apart distance at the forearm support and defining an anatomically-correct width for accommodating forearms of a back rider.

15. A back rider seat according to claim 13, wherein the forearm support includes a planar upper surface adapted to face forwardly when mounted on the motorcycle.

16. A back rider seat according to claim 15, and including an arm pad secured to the planar upper surface of the forearm supports of the left and right armrest.

* * * * *